US012638004B2

(12) United States Patent
Casari et al.

(10) Patent No.: US 12,638,004 B2
(45) Date of Patent: May 26, 2026

(54) PLATFORM FOR THE TAKE-OFF AND LANDING OF AN AIRCRAFT FOR GENERATING ELECTRIC POWER

(71) Applicants: NANTES UNIVERSITE, Nantes (FR); ESTACA, Montigny-le-Bretonneux (FR)

(72) Inventors: Pascal Casari, Saint Nazaire (FR); Jean Christophe Walrick, Laval (FR)

(73) Assignees: NANTES UNIVERSITE, Nantes (FR); ESTACA, Montigny-le-Bretonneux (FR)

( * ) Notice: Subject to any disclaimer, the term of this patent is extended or adjusted under 35 U.S.C. 154(b) by 32 days.

(21) Appl. No.: 18/709,326

(22) PCT Filed: Oct. 13, 2022

(86) PCT No.: PCT/FR2022/051925
§ 371 (c)(1),
(2) Date: May 10, 2024

(87) PCT Pub. No.: WO2023/084167
PCT Pub. Date: May 19, 2023

(65) Prior Publication Data
US 2025/0027475 A1     Jan. 23, 2025

(30) Foreign Application Priority Data

Nov. 10, 2021    (FR) ...................................... 2111971

(51) Int. Cl.
*F03D 5/00*          (2006.01)
*B64U 70/30*        (2023.01)
(Continued)

(52) U.S. Cl.
CPC ............. *F03D 5/015* (2023.08); *B64U 70/30* (2023.01); *B64U 70/99* (2023.01); *F03D 9/25* (2016.05); *B64U 2101/10* (2023.01)

(58) Field of Classification Search
CPC .... B64U 70/30; B64U 70/99; B64U 2101/10; F03D 9/25; F03D 5/015
See application file for complete search history.

(56) References Cited

U.S. PATENT DOCUMENTS 10,800,547 B1 *  10/2020  McGann ................ B64U 80/86
2010/0230968 A1 *  9/2010  Chernyshov .............. F03D 5/00
290/55

(Continued)

FOREIGN PATENT DOCUMENTS

EP         2218642 A2     8/2010
KR     20160071235 A     6/2016
(Continued)

OTHER PUBLICATIONS

Foreign Communication from a Related Counterpart Application, International Search Report dated Jan. 12, 2023, International Application No. PCT/FR2022/051925 filed on Oct. 13, 2022.
(Continued)

*Primary Examiner* — Julio C. Gonzalez
(74) *Attorney, Agent, or Firm* — Conley Rose, P.C.

(57) ABSTRACT

The invention relates to a platform (28) for the take-off and landing of an aircraft (12) for generating electric power by means of a generator (24) and comprising:
a stationary support (30);
a receiving structure (32) that is intended to accommodate the aircraft (12) and is connected to the stationary support (30); The receiving structure (32) is mounted pivotably relative to the stationary support (30) by means of an orientable turntable (38) so as to allow the receiving structure (32) to be positioned according to
(Continued)

the wind direction. The receiving structure (32) for accommodating the aircraft (12) comprises an air-permeable net (34) that is stretched between arms (36) belonging to the receiving structure (32).

9 Claims, 5 Drawing Sheets

(51) Int. Cl.
  B64U 70/99       (2023.01)
  F03D 9/25        (2016.01)
  *B64U 101/10*        (2023.01)

(56)                References Cited

U.S. PATENT DOCUMENTS

| | | | |
|---|---|---|---|
| 2012/0080556 A1* | 4/2012 | Root, Jr. ................... | B64F 1/06 |
| | | | 73/170.28 |
| 2016/0325849 A1 | 11/2016 | Miller et al. | |
| 2022/0258884 A1* | 8/2022 | Stepura ................... | B64F 1/029 |

FOREIGN PATENT DOCUMENTS

| | | | |
|---|---|---|---|
| WO | 2008015663 A1 | 2/2008 | |
| WO | 2023084167 A1 | 5/2023 | |

OTHER PUBLICATIONS

Foreign Communication from a Related Counterpart Application, International Written Opinion dated Jan. 12, 2023, International Application No. PCT/FR2022/051925 filed on Oct. 13, 2022.

* cited by examiner

[Fig. 1]
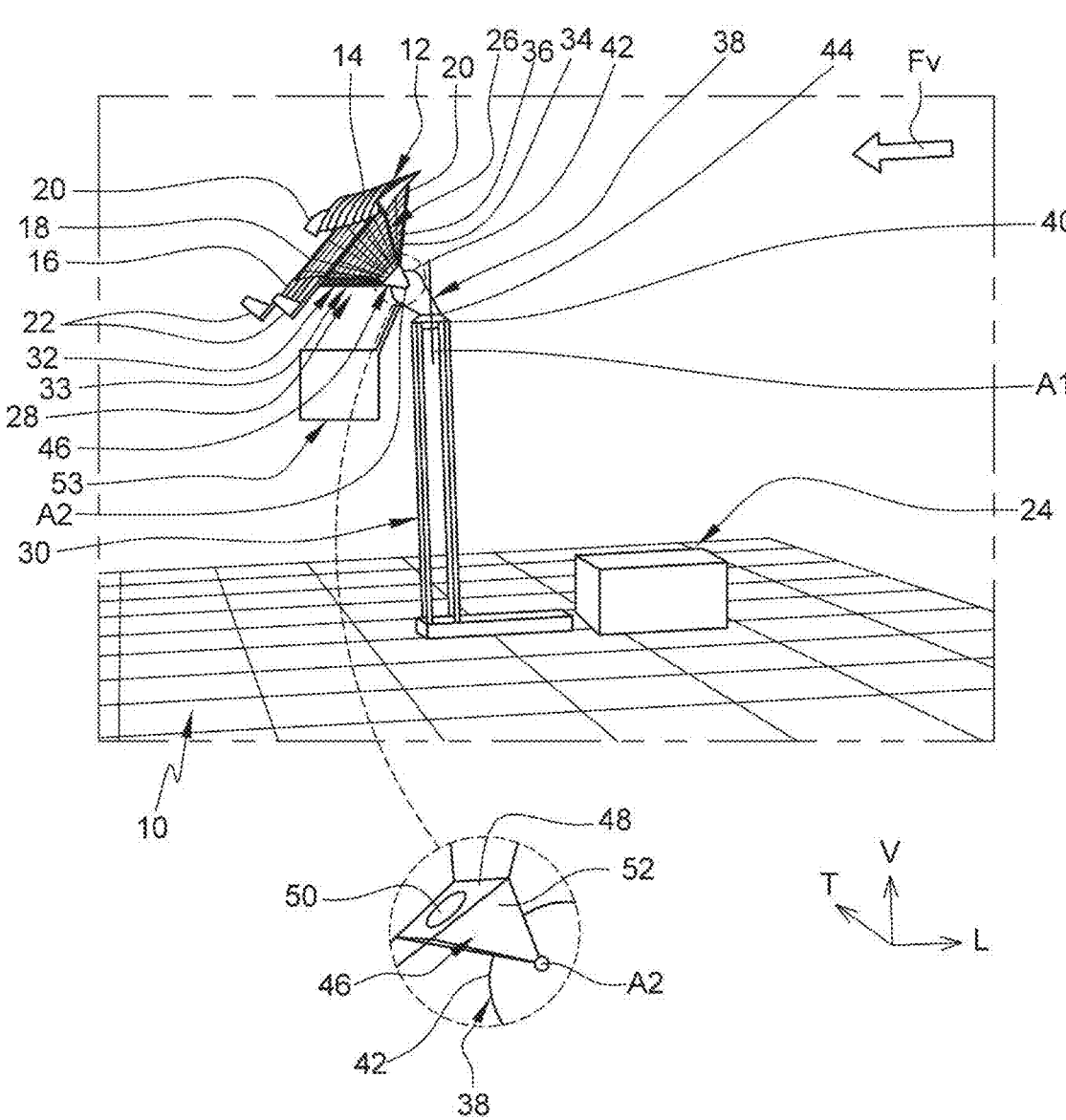

[Fig. 2]
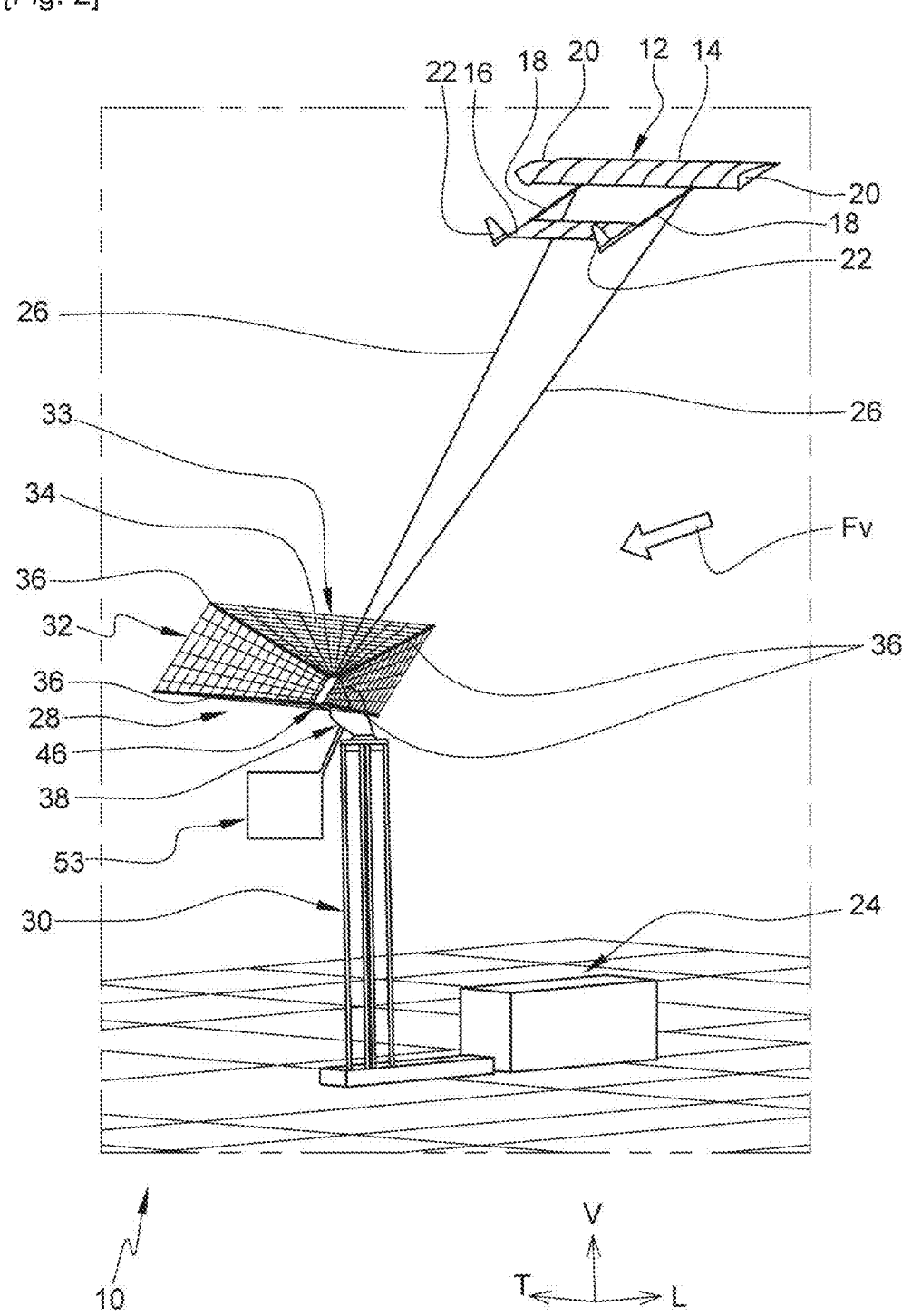

[Fig. 3]
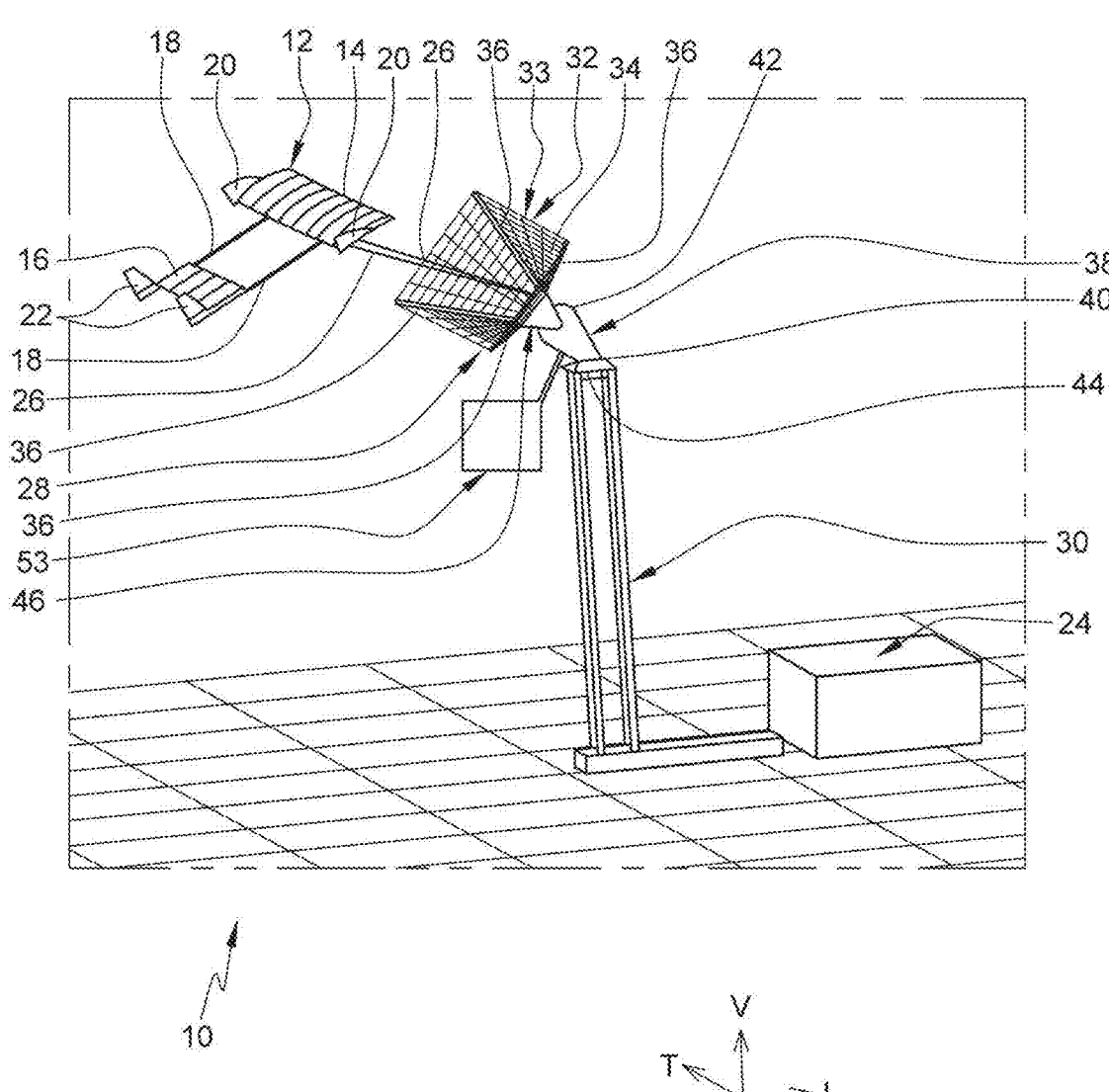

[Fig. 4]
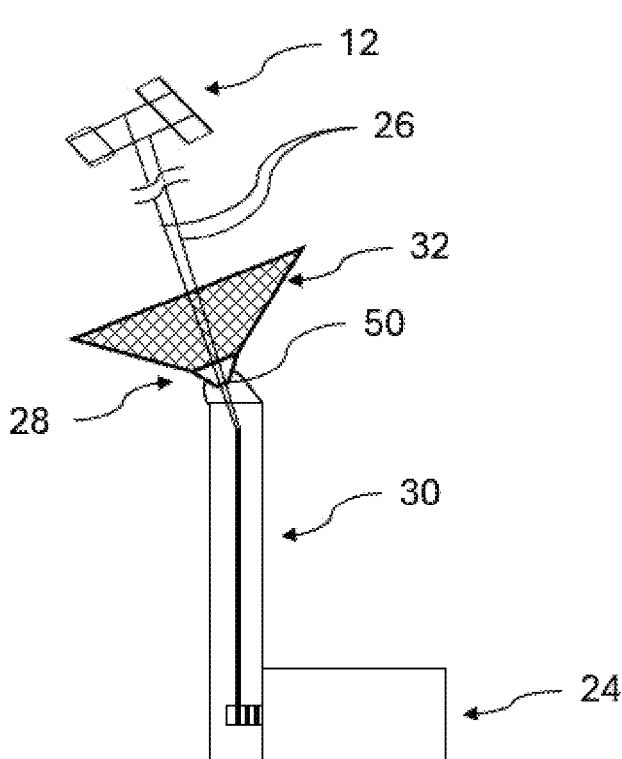

[Fig. 5]
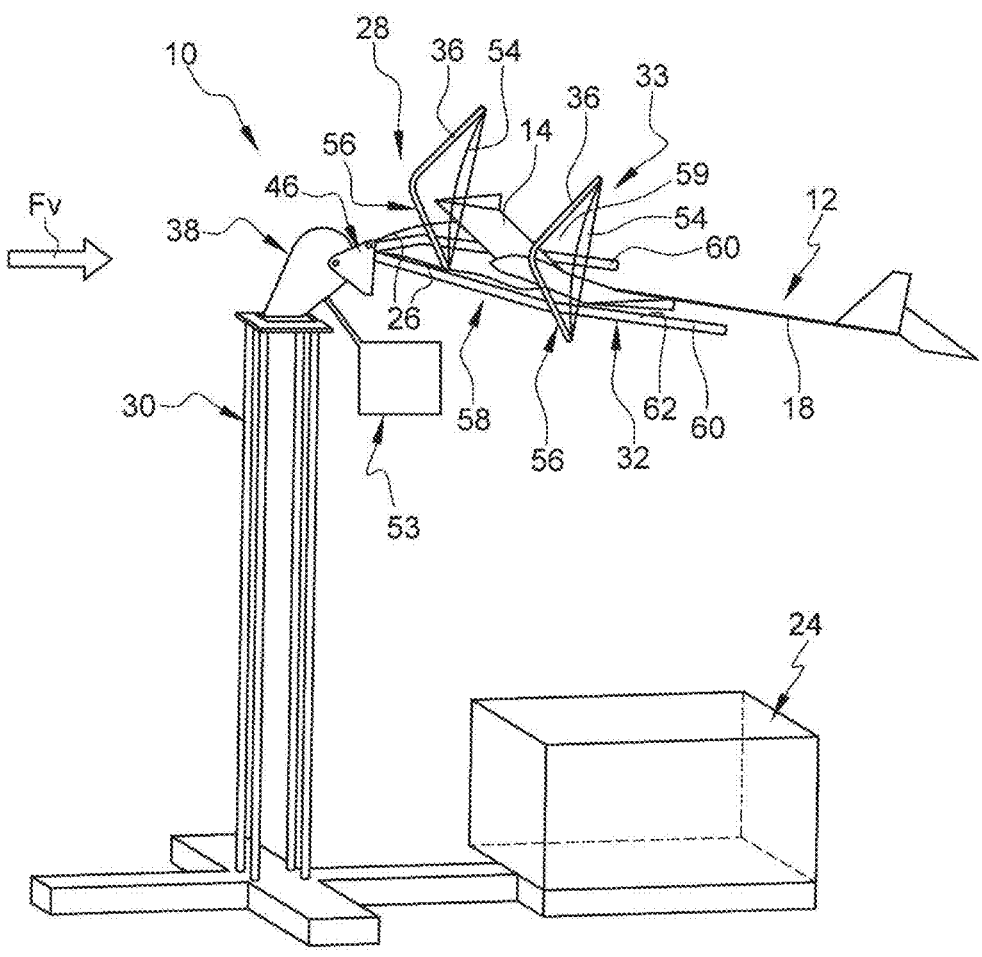
[Fig. 6]
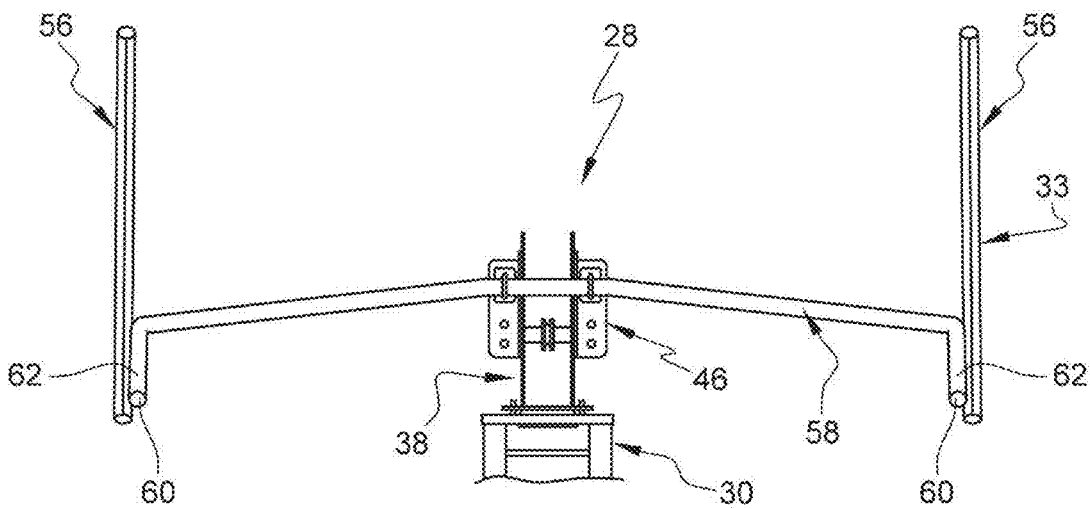

PLATFORM FOR THE TAKE-OFF AND LANDING OF AN AIRCRAFT FOR GENERATING ELECTRIC POWER

CROSS-REFERENCE TO RELATED APPLICATIONS

The present application is a filing under 35 U.S.C. 371 as the National Stage of International Application No. PCT/FR2022/051925, filed Oct. 13, 2022, entitled "PLATFORM FOR THE TAKE-OFF AND LANDING OF AN AIRCRAFT FOR GENERATING ELECTRIC POWER", which claims priority to French Application No. 2111971 filed with the Intellectual Property Office of France on Nov. 10, 2021, both of which are incorporated herein by reference in their entirety for all purposes.

TECHNICAL FIELD OF THE INVENTION

The present invention relates to a system for generating electric power by means of an aircraft. More specifically, the invention relates to a platform for the takeoff and landing of an aircraft.

TECHNICAL BACKGROUND

It is known that an electric power generation system can be produced using an aircraft, also known as a "flying wind turbine", which is connected to a ground-based generator by means of at least one line or cable. This type of system makes it possible to access powerful, abundant winds blowing at altitude.

The challenge for this type of system is to be able to take off and land the aircraft easily, possibly autonomously, without having to design a complex and costly structure.

The invention proposes a platform for the takeoff and landing of an aircraft incorporating an aircraft landing structure suitable for both aircraft takeoff and landing and with a small footprint.

The system will take up very little space and be easy to maintain, so that it can be deployed in areas with little infrastructure.

SUMMARY OF THE INVENTION

The invention proposes a platform for the takeoff and landing of an aircraft for generating electric power by means of a generator and comprising:
- a stationary support,
- a receiving structure that is intended to accommodate an aircraft and is connected to the stationary support,
- characterized in that the receiving structure is pivotally mounted relative to the stationary support by means of an orientable turntable so as to allow the receiving structure to be positioned according to the wind direction,
- and in that the receiving structure of the aircraft comprises a flexible air-permeable device that is stretched taut between arms belonging to the receiving structure.

The invention thus proposes a platform for the takeoff and landing of an aircraft without propulsion means, capable of taking off by the force of the wind alone. The takeoff and landing platform of the invention allows the aircraft to be pitched in such a way as to generate sufficient lift to enable it to take off and generate electric power by means of a cable pulling on a ground-mounted generator. The aircraft is able to land as the generator becomes the motor and rewinds the cable to ensure the aircraft has sufficient descent speed to fly back to the platform.

According to other features of the takeoff and landing platform:
- the orientable turntable is rotatable about a substantially vertical main axis of rotation;
- the platform comprises a tiltable base which bears the receiving structure and is mounted pivotably about a pivot axis relative to the orientable turntable;
- the pivot axis is substantially transverse relative to the main axis of rotation;
- the tiltable base has a passage for guiding a line to be connected to the aircraft towards the generator;
- the tiltable base comprises:
- a main body comprising the passage, and
- two retaining arms which extend from the main body towards the orientable turntable and are connected to the orientable turntable by the pivot axis;
- the main body of the tiltable base has a rectangular shape, and each arm of the receiving structure has one end attached to a corner of the main body;
- the flexible device comprises at least two elastic elements which are arranged on either side of a vertical median plane of the landing structure so as to cushion the landing of the aircraft in the landing structure;
- the two spring elements are stretched taut between the two arms of a side frame, for example V, C or U shaped;
- the receiving structure comprises a main frame attached to the tiltable base and two side arms extending away from the tiltable base and which together form a support surface designed to support aircraft wings in an aircraft rest position.

The invention also proposes an electric power generating system comprising:
- an aircraft,
- a generator designed to produce electric power from the forces applied by the wind to the aircraft via a cable,
- at least one line to connect the aircraft to the generator;
- characterized in that it comprises a takeoff and landing platform according to one of the preceding features.

BRIEF DESCRIPTION OF THE FIGURES

Further features and advantages of the invention will become apparent from the following detailed description, which may be understood with reference to the attached drawings wherein:

FIG. 1 is a schematic perspective view of an electric power generation system equipped with an aircraft takeoff and landing platform comprising an aircraft receiving structure according to a first embodiment of the invention, in an aircraft rest position, the aircraft being pitched up to be ready for takeoff;

FIG. 2 is a perspective view of the electric power generation system shown in FIG. 1, in an aircraft takeoff position, where the aircraft has taken off and exerts a tensile force on the cable connecting it to the takeoff platform in order to drive a generator located on the ground;

FIG. 3 is a perspective view of the electric power generation system shown in FIG. 1, in a position just before the aircraft lands;

FIG. 4 is schematic representation of the electric power generation system shown in FIG. 1, in a position just before the aircraft lands;

FIG. 5 is a perspective view similar to that of FIG. 1, which represents a second embodiment of the system according to the invention when the aircraft is in the rest position;

FIG. 6 is a rear view schematically showing the receiving structure of the system shown in FIG. 5.

DETAILED DESCRIPTION OF THE INVENTION

For the description of the invention and comprehension of the claims, the vertical, longitudinal and transverse orientations according to the reference frame V, L, T indicated in the figures, whose longitudinal L and transverse T axes extend in a horizontal plane, will be adopted in a non-limiting manner and without reference to earth's gravity.

In the following description, identical, similar or analogous elements will be referred to by the same alphanumeric reference numbers.

First Embodiment

FIGS. 1, 2, 3 and 4 show an electric power generation system 10 comprising:

an aircraft 12, a generator 24 intended to produce electric power from the forces applied by the wind to the aircraft 12, two lines 26 for connecting the aircraft 12 to the generator 24, and a takeoff and landing platform 28.

The aircraft 12 has a main wing 14 and a secondary wing 16, which acts as a stabilizer, substantially planar, with the main wing 14 having a greater wingspan than the secondary wing 16. The main wing 14 and the secondary wing 16 are each arranged in a plane parallel to one another and are connected together by a rigid structure 18.

The rigid structure 18 comprises one or two bars arranged parallel to one another and each is connected at a first end to the main wing 14 and at a second end to the secondary wing 16 of the aircraft 12.

As shown in the figures, the wings 14, 16 are arranged in the same plane. In addition, two front ailerons 20 are arranged on either side of the main wing 14 and two rear ailerons 22 are arranged on either side of the secondary wing 16 of the aircraft 12.

Preferentially, the wings 14, 16 of the aircraft 12 are made of a low-cost, rigid material that is easy to maintain and deploy.

Advantageously, the aircraft 12 is made entirely of rigid materials.

The rigid materials used to make the aircraft are, for example, balsa, foam or composite materials.

Each line 26 is in the form of a cable connected at a first end to the rigid structure 18 of the aircraft 12 and connected at a second end to a main cable linking the generator 24 via the platform, between a wound-up state and a deployed state of the line 26, as shown in FIG. 4. During the captive flight phase of the aircraft 12, the lines 26 are in a deployed state and under tension, enabling the generator 24 to produce electric power.

According to one exemplary embodiment of the invention shown in the figures, the system 10 is equipped with two lines 26 for controlling the aircraft 12 in the air during the takeoff, flight and landing phases.

According to another exemplary embodiment of the invention, not shown, the system 10 is equipped with a single line 26. In this case, the aircraft 12 is controlled in the air by means of an external control unit providing electronic control of the aircraft 12, for example by controlling the position of its ailerons 20, 22.

The takeoff and landing platform 28 comprises a stationary support 30 and a receiving structure 32 of the aircraft 12 which is intended to accommodate the aircraft 12 and is connected to the stationary support 30.

As shown, the stationary support 30 is installed on a planar surface that can also accommodate the generator 24. This is either a pylon (aluminum latticework) or a vertical pole of sufficient height to raise the aircraft 12 above the ground surface.

According to the first embodiment shown in FIGS. 1 to 3, the receiving structure 32 of the aircraft 12 comprises a flexible device 33 in the form of an air-permeable net 34 and four arms 36 for tensioning the net 34.

According to one embodiment (not shown) of the receiving structure 32, it comprises a frame on which the edge of the net 34 is hooked and intended for tensioning the net 34.

Advantageously, the net 34 is made of a woven or non-woven textile material, with openwork mesh for the passage of air through the net 34.

Advantageously, the receiving structure 32 comprises at least one elastic element, not shown, designed to cushion the landing of the aircraft 12 in the receiving structure 32.

According to a first exemplary embodiment of the receiving structure 32, each elastic element is arranged to elastically connect one arm 36 with the net 34 of the receiving structure 32. In this case, the elastic element is, for example, a fastener made of an elastic material such as rubber.

According to a second exemplary embodiment of the receiving structure 32, each arm 36 of the receiving structure 32 has elastic properties so as to be sufficiently flexible to be able to flex when the aircraft 12 lands in the receiving structure 32.

The receiving structure 32 is mounted pivotably about a vertical axis V and a transverse axis T, corresponding to a main axis A1 and a transverse axis A2, relative to the stationary support 30, so as to enable the receiving structure 32 to be positioned according to the wind direction and thus enable the aircraft 12 to take off or land. The pivoting of the receiving structure 32 about axes A1, A2 also enables a neutral state if the aircraft 12 has to remain on the ground, for example in strong winds. In this case, the receiving structure 32 holds the aircraft 12 horizontally to minimize its lift. The receiving structure 32 is generally oriented like a weathervane, that is, it follows the wind direction Fv while being free to rotate along the main axis A1.

More particularly, the receiving structure 32 is pivoted by an orientable turntable 38 connected to the stationary support 30 and rotatable about the substantially vertical main axis A1. The main axis A1 can be slightly inclined to the vertical, for example up to an angle of 10 or 15 degrees. The orientable turntable 38 has a lower section 40 connected to the stationary support 30, and an upper section 42 connected to the tiltable base 46 via a swivel element 44. The orientable turntable 38 is substantially trapezoidal in shape, with a rounded side forming the upper section 42. The orientable turntable 38 is arranged on the stationary support 30 so as to be inclined at a certain angle to the vertical axis in order to prevent the aircraft 12 from being incorrectly positioned in relation to the wind.

The tiltable base 46, which can be motorized, carries the receiving structure 32 and is mounted pivotably relative to the orientable turntable 38 about a pivot axis A2 substantially transverse to the main axis of rotation A1. The pivot axis A2 can be slightly inclined to a transverse direction T, for example up to an angle of 10 or 15 degrees to the transverse direction T.

The tiltable base 46 comprises:

a main body 48 comprising a passage 50 for guiding the lines 26, two retaining arms 52 which extend from the main body 48 towards the orientable turntable 38 and are connected to the orientable turntable 38 by the swivel axis A2.

The tiltable base 46 has a limited swivel range relative to the swivel axis A2 so as to block rotation of the tiltable base to maintain the aircraft's incidence at an optimum angle relative to the wind direction.

According to one exemplary embodiment of the invention shown in the figures, the main body 48 of the tiltable base 46 has a rectangular shape. The retaining arms 52 are parallel to one another and substantially perpendicular to the main body 48 of the tiltable base 46. In this case, each arm 36 of the receiving structure 32 has one end that is attached to one corner of the main body 48 of the tiltable base 46, and the net 34 is stretched between each pair of arms 36.

Advantageously, a planar weathervane 53, here in the form of a longitudinal plate connected to the orientable turntable 38, keeps the orientable turntable 38 and the receiving structure 32 permanently in the axis of the wind, even when the aircraft 12 is in flight.

As shown in FIG. 1, in the rest position of the aircraft 12 in the receiving structure 32 of the takeoff and landing platform 28, the aircraft 12 is resting in the net 34 and the lines 26 are in a wound-up state. Here, the aircraft 12 is in a nose-up position ready for takeoff, facing the wind direction Fv.

In FIG. 2, during the takeoff phase of the aircraft 12 from the receiving structure 32 of the takeoff and landing platform 28, the receiving structure 32 is oriented by means of the orientable turntable 38 and the tiltable base 46 so as to position the aircraft 12 into the wind and cause it to take off. During this phase, the net 34 is stretched taut and the lines 26 are in an unwound and taut state.

To reach the flight phase of the aircraft 12, the aircraft 12 is controlled by the lines 26 to reach a high altitude. Advantageously, the aircraft 12 ascends in a figure-8 formation.

In FIG. 3, during the landing phase of the aircraft 12 towards the receiving structure 32 of the takeoff and landing platform 28, the receiving structure 32 is oriented by means of the orientable turntable 38 and the tiltable base 46 in such a way as to cause the aircraft 12 to land in the receiving structure 32. During this phase, the lines 26 are in an unwound state and are tensioned so as to control the aircraft 12 until it lands.

Second Embodiment

Considering FIGS. 5 and 6, a second embodiment of the electric power generation system 10 according to the invention is now described. The system 10 is similar to the one shown in FIGS. 1 to 3, but differs mainly in its receiving structure 32.

In describing this second embodiment of the invention, the differences will be emphasized and the other components of the system, in particular the aircraft 12 and the stationary support 30, will not be described again.

According to this second embodiment, the receiving structure 32 uses tensioned elastic elements 54 to replace the net 34. More precisely, the elastic device 33 fitted to the receiving structure 32 comprises two strips 54, or cords, of elastic material, each of which is attached by its ends to the free ends of two side frames 56.

Advantageously, each side frame 56 is V-shaped, with each elastic element 54 stretched between the two arms 36 of the V. Alternatively (not shown), each side frame 56 could be C- or U-shaped, compatible with the takeoff and landing of the aircraft 12.

The aircraft 12 rests on these side frames 56.

The two elastic elements 54 are thus arranged on either side of a vertical median plane of the landing structure 32, enabling the elastic device 33 to cushion the landing of the aircraft 12 in the landing structure 32. Thanks to their V-shape, the side frames 56 enable the elastic element 54 to be tensioned, leaving a clearance 59 between the two arms 36 for elastic deformation of the elastic element 54 when the aircraft 12 lands in the landing structure 32. Each elastic element 54 consists of a soft stop to prevent the aircraft 12 from colliding with the rigid frame during docking.

Here, the receiving structure 32 comprises a main frame 58 attached to the tiltable base 46, which is extended at the sides by two side arms 60. The two side arms 60 extend longitudinally towards the rear of the aircraft 12, away from the tiltable base 46. Together, these side arms 60 form a support surface 62, each designed to support part of the main wing 14 of the aircraft 12, when in its rest position.

LEGEND

10: system
12: aircraft
14: main wing
16: secondary wing
18: rigid structure
20: front aileron
22: rear aileron
24: generator
26: line
28: takeoff and landing platform
30: stationary support
32: receiving structure
33: flexible device
34: net
36: arm
38: orientable turntable
40: lower section
42: upper section
44: pivotable element
46: tiltable base
48: main body
50: passage
52: retaining arms
53: planar weathervane
54: elastic element
56: side frame
58: main frame
59: clearance
60: side arm
62: support surface
A1: main axis (vertical V)
A2: pivot axis (transverse T)
Fv: wind direction

The invention claimed is:

1. A platform for the take-off and landing of an aircraft for generating electric power by means of a generator and comprising:

a stationary support, a receiving structure of the aircraft that is intended to accommodate the aircraft and is connected to the stationary support;

wherein the receiving structure of the aircraft comprises:

a main frame mounted pivotably relative to the stationary support by means of an orientable turntable so as to allow the receiving structure to be positioned according to the wind direction; and two side frames supported by two side arms extending the main frame on either side;

and in that the receiving structure of the aircraft comprises a flexible device which is stretched taut so as to be able to cushion the landing of the aircraft in the receiving structure, said flexible device comprising at least two elastic elements which are arranged on either side of a vertical median plane relative to the receiving structure, the two elastic elements are stretched taut between the side frames so as to be able to cushion wings of the aircraft in the receiving structure.

2. The take-off and landing platform according to claim 1, wherein the flexible device is air-permeable.

3. The take-off and landing platform according to claim 1, wherein the orientable turntable is rotatable about a substantially vertical main axis of rotation.

4. The takeoff and landing platform according to claim 1, comprising a tiltable base that carries the receiving structure and which is pivotably mounted relative to the orientable turntable about a pivot axis.

5. The takeoff and landing platform according to claim 4, wherein the tiltable base comprises a passage provided for guiding a line in the form of a cable connected at a first end to a rigid structure of the aircraft and connected at a second end to a main cable linking the generator via the platform.

6. The takeoff and landing platform according to claim 5, wherein the tiltable base comprises:

a main body comprising the passage, and two retaining arms which extend from the main body towards the orientable turntable and are connected to the orientable turntable by the pivot axis.

7. The takeoff and landing platform according to claim 4, wherein the main body of the tiltable base has a rectangular shape, and in that each arm of the receiving structure has one end which is attached to one corner of the main body.

8. The takeoff and landing platform according to claim 4, wherein the main frame is attached to the tiltable base and the two side arms extend on the side opposite the tiltable base and which together form a support surface intended to support wings of the aircraft in a rest position of the aircraft.

9. An electric power generation system comprising:

an aircraft, a generator designed to produce electric power from the forces applied by the wind to the aircraft via a cable, at least one line for connecting the aircraft to the generator, and a takeoff and landing platform according to claim 1.

* * * * *